3 Sheets—Sheet 1.

F. B. A. ROYER De La BASTIE.
FURNACE FOR TEMPERING GLASS.

No. 172,303. Patented Jan. 18, 1876.

Witnesses. F. B. A. Royer de la Bastie,
Inventor
By Atty.

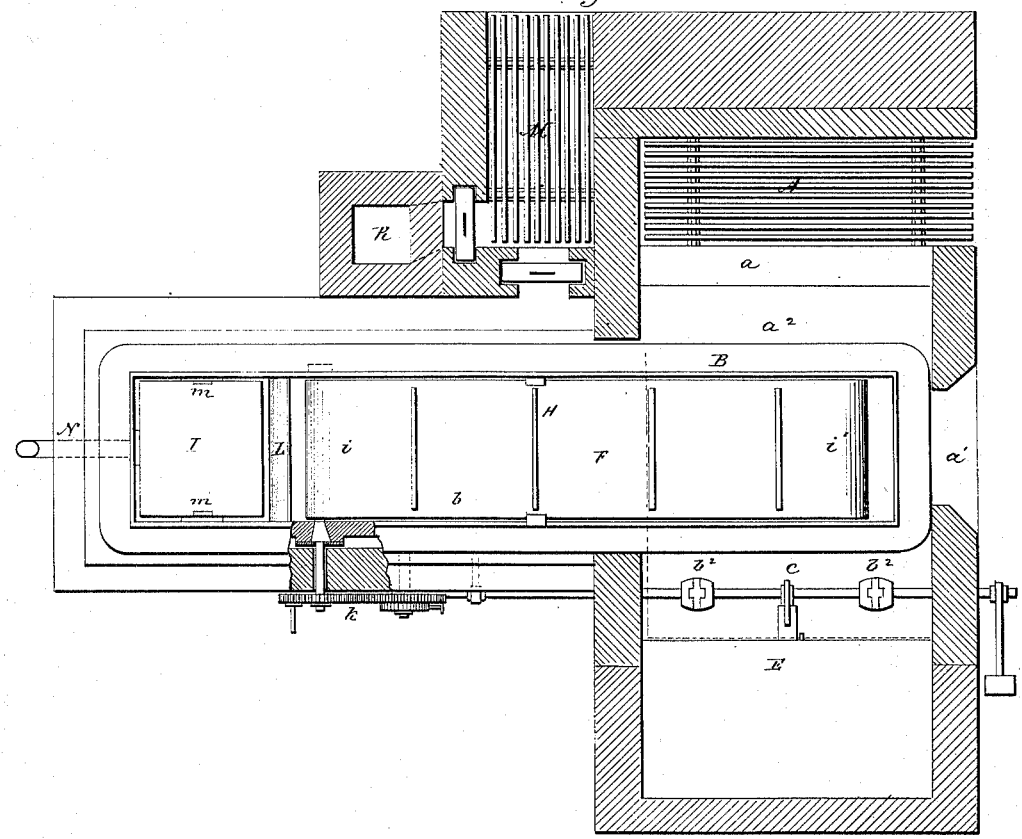

3 Sheets—Sheet 3.
F. B. A. ROYER De La BASTIE.
FURNACE FOR TEMPERING GLASS.
No. 172,303. Patented Jan. 18, 1876.
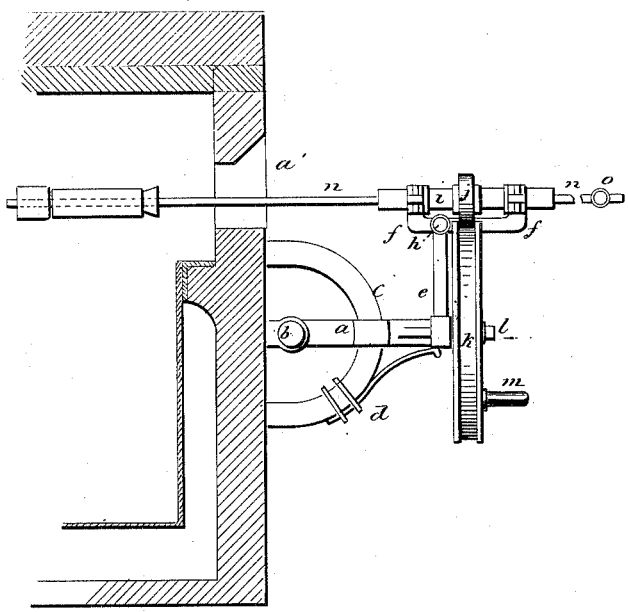
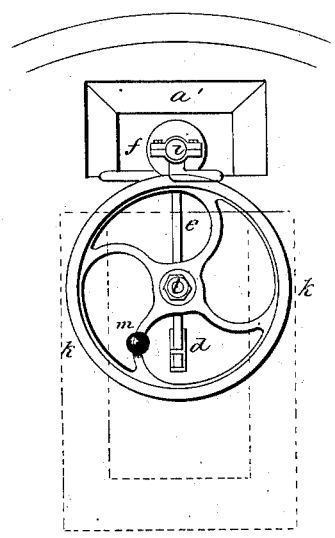
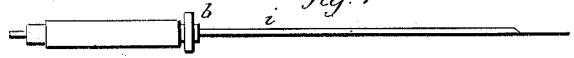
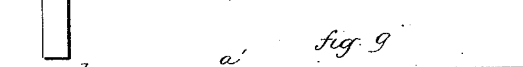
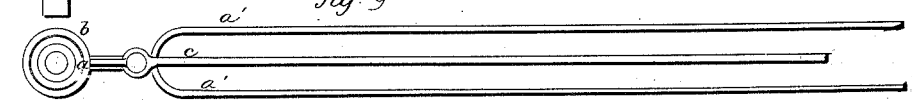
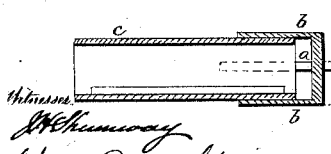

UNITED STATES PATENT OFFICE.

FRANÇOIS BARTHÉLEMY ALFRED ROYER DE LA BASTIE, OF PARIS, FRANCE.

IMPROVEMENT IN FURNACES FOR TEMPERING GLASS.

Specification forming part of Letters Patent No. 172,303, dated January 18, 1876; application filed December 21, 1875.

*To all whom it may concern:*

Be it known that I, F. B. A. ROYER DE LA BASTIE, of Paris, in the Republic of France, have invented a new Improvement in Furnace for Tempering Glass; and I do hereby declare the following, when taken in connection with the accompanying drawings and the letters of reference marked thereon, to be a full, clear, and exact description of the same, and which said drawings constitute part of this specification, and represent, in—

Figure 1:
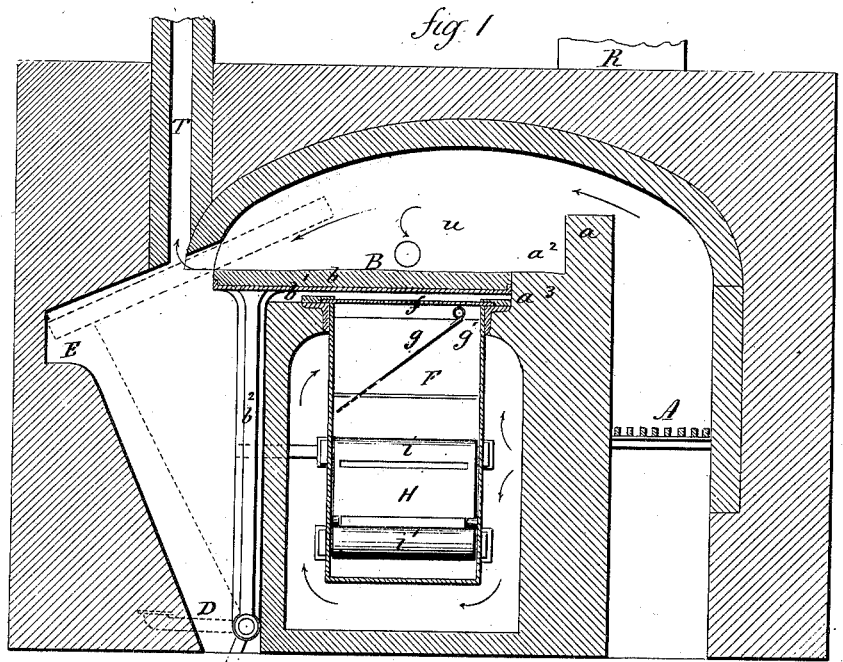
Figure 2:
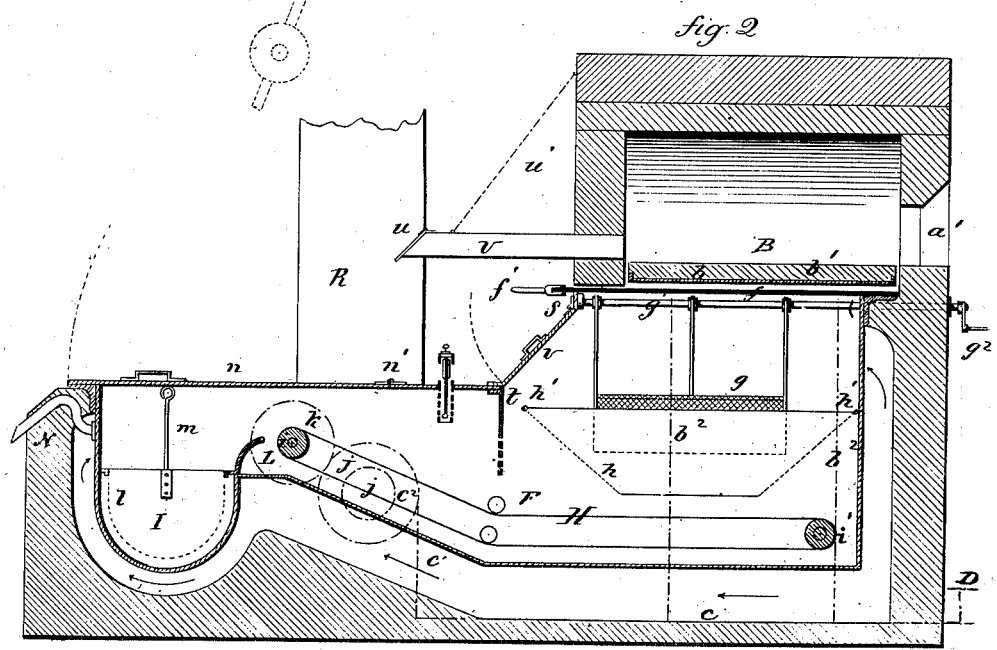

Figure 1, transverse section; Fig. 2, longitudinal section; Fig. 3, horizontal section; Figs. 4 to 10, inclusive, apparatus for introducing articles to the furnace.

This invention relates to an improvement in apparatus for tempering glass under the method for which Letters Patent of the United States were granted to this applicant December 15, 1874, No. 157,717.

This method consists in heating the glass to a malleable state, or temperature approaching that state, and then transferring the heated glass to a tempering-bath heated to a temperature somewhat lower than the glass to be tempered. This bath is preferably of an oily nature, the boiling-point of which is higher than that of water; or it may be any material or substance into which the glass may be plunged, submerged, or buried—that is, the tempering medium must be of something to receive the glass, and which is of a lower temperature than the heated glass, so as to produce a sudden chill. In certain cases solutions of salt, melted metals, alcohol, or pulverized bodies will serve the purpose—as, for instance, animal, vegetable, or mineral greasy substances, glycerine, tar, bitumen, india-rubber, glue, resins, wax, ether, collodion, sulphur, and, generally, any material in a liquid, fused, or powdered state, refractory materials pulverized, flour of grain, isinglass, licopode, plaster.

The foregoing will give a sufficiently clear idea to enable others to practice the invention with the special apparatus hereinafter described, or with any other apparatus adapted to special kinds or qualities of glass.

The object of the present invention set forth in this application is the construction of the apparatus and mechanism connected therewith, for the purpose of tempering other objects than sheet or plate glass, such as are applicable to table service, chimneys, and globes for illuminating purposes, &c.; and the invention consists in the mechanism hereinafter described for receiving and transferring the articles, and the appliances for introducing the articles to the tempering apparatus.

The oven is of rectangular form, and divided by an abutment into two parts—the fire-place A and the table B. The fire-place is built and closed in substantially the same manner as in the previous patent referred to. The flame passes over the abutment $a$, and is carried by the vault into the principal part of the fire-place or furnace for heating the objects to be tempered. These, after having been heated in a preliminary heating-room, or without preliminary heating, if preferred, are introduced into the furnace through an opening, $a^1$, and placed upon the table B.

The table B is movable upon an axis, C; it is formed of a refractory earthen stone, $b$, resting upon a metal plate, $b^1$, where it is securely held. The tray $b^1$ is carried by metal supports $b^2$, terminating in a socket, and keyed to the shaft C, which, by its rotative movement, gives to the table B an oscillating movement, as indicated in broken lines, Fig. 1. Instead of the table B, a reciprocating carriage may be used, guided on rails, as shown in Fig. 3. When the objects placed upon the table B are sufficiently heated, which the workman determines through the opening $a^1$, they are drawn out with a rake upon a small stationary table, $a^2$, below the abutment, and level with the movable table. A pedal, D, is keyed to the outer extremity of the shaft C, by which to oscillate the table upon its axis, and turn it down into a recess, E, built in the wall for receiving it. This movement brings it to the opening of the vat F, containing the bath. The table B is poised by a counter-weight fixed to a shank keyed to the shaft C. The vat being uncovered, the glass objects are transferred to the tempering-bath; then the table is brought back to its horizontal position, so as to rest upon an iron bar, $a^3$, which will serve to support it. The principal part of the vat F is incased in the walls of the furnace beneath the table B, and its opening serves for the introduction of objects to be tempered. This opening is covered by the table; but, as this table is not hermetically closed, so that there would be a liability of inflaming the boiling liquid, this opening is obstructed by a large plate, $f$, which is thrust into grooves on each side of the vat by a handle, $f'$. A crust will frequently form on the surface of the vat, which will be an obstacle to the objects to be tempered. For removing this obstruction a skimmer, $g$, of metallic cloth is placed longitudinally in the principal part of the vat. This skimmer is carried by branches on a shaft, $g^1$, at the extreme point of which is a crank, $g^2$. Before the introduction of the glass the workman turns the crank $g^2$, thereby removing the crust which has formed upon the surface. To do this most advantageously the crank $g^2$ should be connected to the pedal D, and then the skimmer will make the effectual oscillations at the same time as the table. On being plunged into the bath the glasses will sometimes strike against the walls of the vat F; this will occasion their breakage, or, at least, put them out of shape. This inconvenience is avoided by a species of basket, $h$, in metallic cloth, in the form of an inverted cone, and which is supported by the cross-bars $h'\ h'$; this basket serves to conduct the pieces of glass, as they are received, into the bath by an endless metallic apron, H.

The apron H extends the entire length of the vat, and has upon each end movable rolls $i$ and $i'$, guides fixed to the sides of the vat, and bearing only at the edges of the cloth, forcing it to take the form of the bottom of the vat. This cloth is divided into several parts by small plates arranged transversely, and in each of its forward movements it presents one of its divisions as a receptacle under the basket $h$.

For taking the tempered articles from the vat, the cloth H is made to advance mechanically, when they will be thrown into a receiver, I, at the end of the vat F. This movement is obtained by means of the pedal D at the time when the table is made to oscillate.

The shaft C extends through, and is connected by a train of gears to, a gear-wheel, $k$, on the shaft $i$, outside the vat. The shaft $i$ extends through the vat, and is provided with a conical bearing for friction, the other end supported in the opposite wall; then, by pressing upon the pedal D, for the operation before mentioned, at the same time causes the apron H to move. Releasing the pedal it rises; but the connection of the shaft C with the apron must be such (preferably a pawl and ratchet) that the returning of the shaft does not affect the apron. The vat F at its opposite side from the oven terminates in a receptacle, I, the bottom of which is curved. In this receptacle is placed a basket, $l$, of metallic cloth, or a plate of same form, the edge of which has a rim or flange resting upon ledges on the walls of the vat.

The tempered objects brought by the endless apron are conducted by the curved guide into the basket, which, as soon as filled, is raised and replaced by another. In some cases there may be substituted for the basket a vat full to the lowest part.

The vat, constructed of the same form as those for glass plates, is supported on the walls by iron flanges. A space is left between the vat and the masonry, for the passage of the flame from the fire-place M, constructed and arranged the same as that used for glass plates. A spout or siphon, N, is arranged for maintaining the level of the liquid in the vat, and a thermometer, $o$, indicates the degree of temperature in the bath. In the part outside the oven the vat F is closed by a cover in three parts. The first, $n$, hinged at $n'$, is opened by means of a handle to raise the basket $l$ when it is filled, and in putting another in its place. The second part, $o$, is fixed, and carries the thermometer, and so that a pipe may be arranged for liberating the vapors of the vat, similar to that described in the oven for glass plates. The third part or door, $r$, hinged at $s$, is arranged for looking into the interior of the bath. The transverse rigidity of the cover is maintained by a plate, $t$, set edgewise, and dividing the vat into two parts. The chimney T regulates the heat of the furnace, and the chimney R of the fire-place M, and are arranged as those for glass plates.

A pipe, U, closed by a door, $u$, and supported outside by a chain, $w'$, opening into the side of the oven opposite the aperture $a^1$, heated by the oven, serves for the drying-room for glass lamps and small objects of any character, which are introduced by the door $u$, and pushed by hand or with a rake.

As in all ovens where a great heat is necessary, the parts of the walls which are directly in contact with the flames are constructed of refractory brick. The rest is made of ordinary brick.

I will now proceed to the description of tools to facilitate the tempering of special articles, and as illustrated in Figs. 4 to 10, inclusive. The special articles to which these tools are adapted are cylinders, or of cylindrical form, such as tubes, chimneys, and glasses of like form.

The apparatus shown in Figs. 4 and 5 is represented as applied to the exterior wall of the furnace, so as to work through the aperture $a'$ in the furnace-wall, that part of the furnace shown being a portion of that represented in Fig. 2, the table, when these tools are used, being turned away, as in broken lines, Fig. 1. A horizontal arm, $a$, is hinged at $b$, and works upon a sector, $c$, which regulates the movement of the arm. It is held by a spring, $d$. The arm $a$ terminates in a head, upon which is a vertical support, $e$, provided with two horizontal bearings, $ff$. The support $e$ is provided with a handle, for raising the apparatus when it is necessary. In the bearings $ff$ a hollow shaft, $i$, turns, carrying a pulley, $j$, receiving its movement by the friction of a pulley, k, turning on an axis in the arm a by means of a crank-handle, m, or other device. In the hollow shaft i is the square shank of a rod, n, on which is a collar of conical form, to hold the glass to be tempered. The other end of the shank is furnished with a ball, o, of such sort that, in turning the wheel k, the workman, having in his hand the ball o, may push or draw back the rod through the shaft i.

The apparatus being in the position indicated in Fig. 4, the workman, having arranged the chimney on the rod n, supported upon the conical head of the rod, with or without preliminary heating or drying, introduces the chimney into the heating-oven through the aperture $a^1$, to be heated, and then, turning the crank, imparts to the glass a rapid rotative movement. When the glass is sufficiently heated, (which the workman determines by looking through the aperture,) he still continues to turn the wheel k and raises the apparatus, as indicated in broken lines, Fig. 4, and the glass is plunged, still turning, into the vat, which has been previously uncovered. The glass falling from the rod remains in the vat, to be removed as before described. Then, returning the apparatus to the first position, the same work is performed upon another chimney.

Fig. 6 represents the rod i detached. Fig. 7 shows the rod i, on which is an enlargement, a, and a head, b, formed of porcelain or refractory matter fixed upon the metal. This is used for tempering glass globes.

Figs. 8 and 9 represent an apparatus for holding chimneys or other articles, such as goblets, bottles, decanters, &c., in a vertical position. It consists of a triple tongs, or three parts, the two handles $a^1$ each terminating in a jaw, a, and formed so as to encircle the article. In addition to these, and upon the same pivot, is the third handle c, the end of which rises and encircles the article, as b. The object of this third part b is to prevent the article from sticking to either of the jaws a, and so that when the jaws a are open a slight movement of the ring will loosen the article.

Fig. 10 shows a tubular receptacle, c, supported upon the rod i by fingers b, projecting from the head a. This tube c is made of earthen, and the article placed within it, as shown, is introduced into the furnace, and, when the article is properly heated, is plunged into the bath, as before mentioned.

The automatic apparatus for imparting the revolving movement to the carrying-rod may be detachable from the furnace when not required for this class of work, the object of this being to adapt the furnace to numerous classes of articles of irregular figures.

Having thus fully described the improvements in the furnace, I will proceed to recite what is claimed as new and useful, and for which Letters Patent is desired.

I claim—

1. In an apparatus for tempering glass, the combination of a heating-chamber, a movable floor or table, forming the floor of the said heating-chamber, and an aperture opening from the outside into said chamber, a bath beneath the said floor, exposed by the movement of the floor from over the bath, whereby the articles heated upon the said floor may be plunged into the bath beneath, substantially as described.

2. In an apparatus for tempering glass, the combination of a heating-chamber, an aperture opening from the outside to the said chamber, a bath below the said chamber, an endless apron below the surface of the said bath, operating substantially as described, to transfer the articles dropped into the bath from the heating-chamber to a position for removal.

3. The combination, in a furnace for tempering glass, of a heating-chamber, an aperture opening to the said chamber for the introduction of articles, a bath beneath the said chamber, into which articles heated in the said chamber, are plunged, an endless apron arranged beneath the surface of the bath to receive and transfer the articles received from the heating-chamber, and a removable receiver below the surface of the said bath, to which the said articles are delivered by the said apron, substantially as described.

4. In a furnace for tempering glass, the combination of a heating-chamber, an aperture through which articles are introduced to said chamber, a bath beneath the said chamber, into which the said articles are plunged after heating, and the basket or protector h, substantially as and for the purpose described.

5. In a furnace for tempering glass, the combination of a heating-chamber, an aperture for the introduction of articles to said chamber, a removable table, forming the bottom of said chamber, a bath beneath the said table, and an auxiliary removable cover, f, on said bath, substantially as and for the purpose described.

6. In combination with a furnace for tempering glass, a mechanism, substantially such as described, for supporting and revolving the articles to be tempered.

FRANÇOIS BARTHÉLEMY ALFRED ROYER DE LA BASTIE.

Witnesses:
STE. DU PELOUX,
J. LÉON DUFRESNE.